(12) United States Patent
Zhao (10) Patent No.: US 7,894,328 B2
(45) Date of Patent: Feb. 22, 2011

(54) METHOD, APPARATUS AND SYSTEM FOR DETECTING MODE AND GUARD INTERVAL

(75) Inventor: Yahong Zhao, Beijing (CN)

(73) Assignee: Via Technologies, Inc., Taipei (TW)

( * ) Notice: Subject to any disclaimer, the term of this patent is extended or adjusted under 35 U.S.C. 154(b) by 705 days.

(21) Appl. No.: 11/772,040

(22) Filed: Jun. 29, 2007

(65) Prior Publication Data

US 2008/0247307 A1    Oct. 9, 2008

(30) Foreign Application Priority Data

Apr. 6, 2007    (CN) .................. 2007 1 0096751

(51) Int. Cl.
*H04J 11/00* (2006.01)

(52) U.S. Cl. ............. 370/208; 370/210; 370/252; 370/503; 375/324; 375/348; 375/360

(58) Field of Classification Search .............. None
See application file for complete search history.

(56) References Cited

U.S. PATENT DOCUMENTS

| | | | |
|---|---|---|---|
| 2004/0228270 A1* | 11/2004 | Chen et al. ............. | 370/210 |
| 2005/0179570 A1* | 8/2005 | Yagi et al. ............. | 341/60 |
| 2005/0265488 A1* | 12/2005 | Jung ............. | 375/340 |
| 2006/0140109 A1 | 6/2006 | Lin ............. | 370/208 |
| 2006/0140110 A1 | 6/2006 | Lin ............. | 370/208 |
| 2007/0140323 A1* | 6/2007 | Patel et al. ............. | 375/149 |
| 2009/0067515 A1* | 3/2009 | Galperin et al. ............. | 375/260 |
| 2009/0122200 A1* | 5/2009 | Tatsumi ............. | 348/723 |

OTHER PUBLICATIONS

"Digital Video Broadcasting (DVB); Framing structure, channel coding and modulation for digital terrestrial television", European Standard (Telecom. Series) ETSI EN 300 744 V1.5.1, 64 pgs. (2004).
Li Zou, "Automatic Detection of the Guard Interval Length in OFDM System", J. of Comm. vol. 1, No. 6, pp. 28-32 (2006).

* cited by examiner

*Primary Examiner*—Chi H. Pham
*Assistant Examiner*—Shick Hom
(74) *Attorney, Agent, or Firm*—Squire, Sanders & Dempsey (US) LLP (57) ABSTRACT

The present invention is directed to a method, apparatus and system for detecting the mode and the guard interval of a received orthogonal frequency division multiplexing (OFDM) symbol, which includes a guard interval with length $N_g$, and a useful part with length $N_u$. Mode is detected by searching for the maximum correlation or statistics value based on one (for example, the shortest one) guard interval length. Further, guard interval is detected by searching for the maximum correlation value based on all guard interval lengths.

21 Claims, 7 Drawing Sheets

METHOD, APPARATUS AND SYSTEM FOR DETECTING MODE AND GUARD INTERVAL

BACKGROUND OF THE INVENTION

1. Field of the Invention

The present invention generally relates to a method, apparatus and system for detecting the mode and the guard interval, and more particularly to a method, apparatus and system for detecting the mode/guard interval for an orthogonal frequency division multiplexing (OFDM) system.

2. Description of the Prior Art

Orthogonal frequency division multiplexing (OFDM) is a communication technique that uses frequency division and multi-carrier modulation, and is widely applied in a variety of digital communication systems, such as the Digital Video Broadcasting (DVB), a standard drafted by Joint Technical Committee consisted of European Broadcasting Union, Comité Européen de Normalisation ELECtrotechnique, and European Telecommunications Standards Institute. In an OFDM system, there exist several modes according to respective Fast Fourier Transform (FFT) size. Further, a guard interval (GI) is inserted between adjacent data symbols for preventing inter-symbol interference. For minimizing the inefficiency owing to the guard interval insertion, a transmitter usually dynamically varies the length of the guard interval according to the quality of communication. Some transmitter sends pilot symbol to inform the receiver of the length of the guard interval, thereby complicating the system and lower down the process speed. Some OFDM systems without sending pilot signaling therefore need other ways to acquire the mode and the guard interval.

A few OFDM systems are conventionally proposed to overcome the drawbacks discussed above. Among the conventional OFDM systems, some cannot fully detect the mode/guard interval, while some detect the mode/guard interval with considerable error rate. For the reason, those conventional systems could not effectively overcome the drawbacks, a need has accordingly arisen to propose a method and system that could fully and automatically detect the mode/guard interval with insignificant error rate.

SUMMARY OF THE INVENTION

In view of the foregoing, it is an object of the present invention to provide a method, apparatus and system for automatically detecting the mode and the guard interval, with substantially reduced error rate.

It is another object of the present invention to provide a novel correlation structure for sub-dividing search range in an OFDM system.

According to the object, the present invention provides a method and system for detecting the mode and the guard interval. Firstly, an OFDM symbol is received, which includes a guard interval with length $N_g$, and a useful part with length $N_u$. The OFDM symbol has various modes and kinds of guard intervals. A mode detection step is performed for detecting the mode of the OFDM symbol, based on maximum correlation of the OFDM symbol, with respect to one (for example, the shortest) guard interval ratio. A guard interval ratio detection step is performed for detecting the guard interval ratio of the OFDM symbol, based on the maximum correlation of the OFDM symbol with respect to all of the guard intervals ratios.

According to one embodiment, after the mode detection step, a step is further performed to evaluate validity of the mode detection by comparing the statistics value with a threshold value. The mode detection step is repeated until the validity is confirmed, and followed by performing the guard interval detection step. Furthermore, according to the embodiment, after the guard interval detection step, a step is further performed to evaluate validity of the guard interval detection step by comparing a timing deviation between two of the OFDM symbols with a timing error tolerance constant. The mode detection step is repeated until an absolute value of the timing deviation is less than the timing error tolerance constant.

According to another embodiment, the present invention provides apparatus for detecting mode and guard interval of an orthogonal frequency division multiplexing (OFDM) symbol. The apparatus includes a mode detection device and a guard interval ratio detection device. The mode detection device is used to detect the mode of the OFDM symbol, based on maximum correlation of the OFDM symbol, with respect to one of the guard interval ratios. The guard interval ratio detection device is used to detect the guard interval ratio of the OFDM symbol, based on the maximum correlation of the OFDM symbol with respect to all of the guard interval ratios.

DETAILED DESCRIPTION OF THE INVENTION

Figure 1:
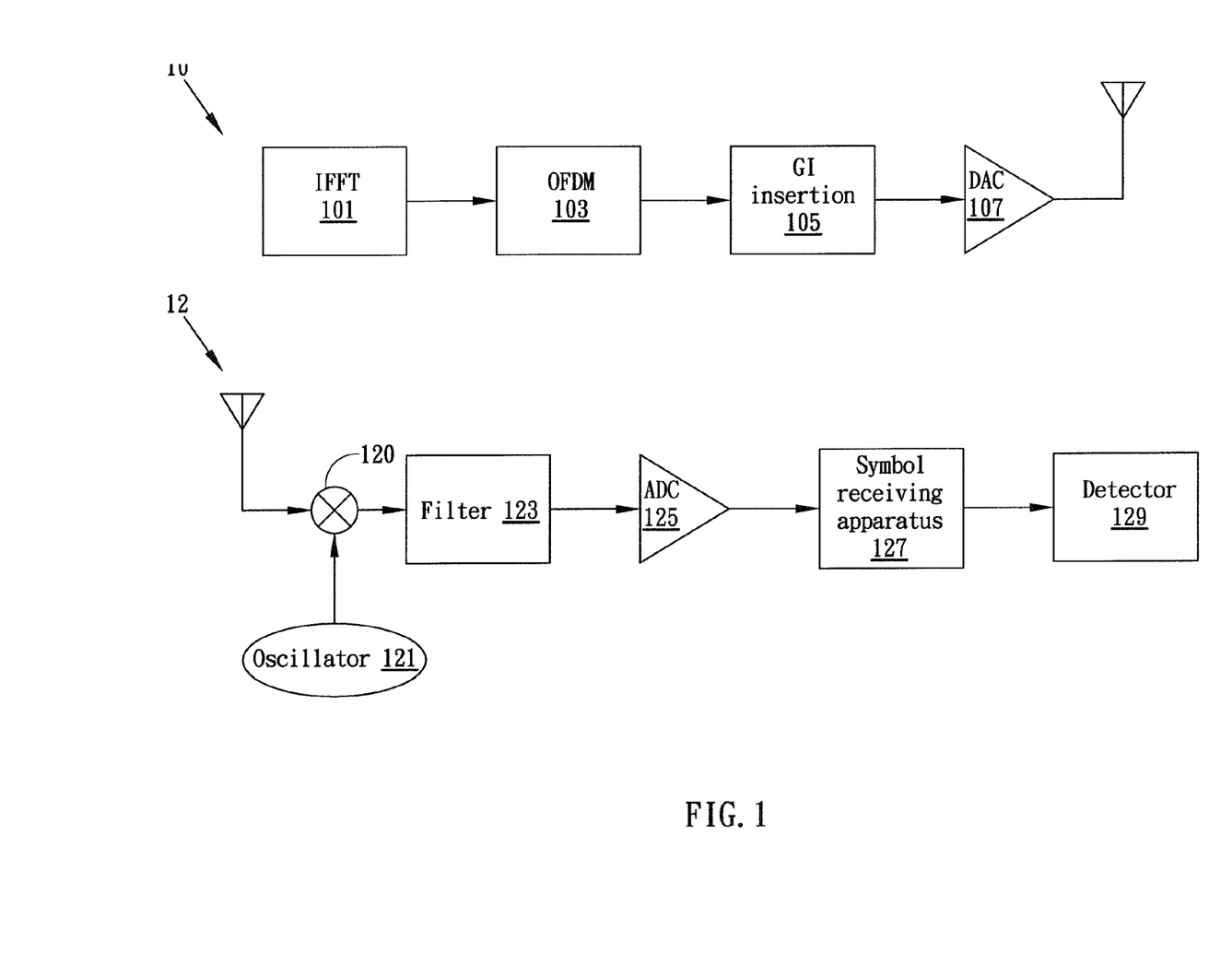
FIG. 1 illustrates a communication system according to one embodiment of the present invention.

FIG. 1 illustrates a communication system, which applies orthogonal frequency division multiplexing (OFDM) technique in the Digital Video Broadcasting-Handheld (DVB-H), according to one embodiment of the present invention. In addition to the DVB-H, the present embodiment is widely adaptable to other OFDM systems, either existing or future, DVB systems or their equivalents. Digital Video Broadcasting-Terrestrial (DVB-T) is one of the examples. For the sake of clarity, only relevant portions of a transmitter 10 and a receiver 12 are shown in FIG. 1. It is appreciated by a person skilled in the art that the arrangement order of the function blocks of the transmitter 10 or the receiver 12 is not restricted to that of FIG. 1; and the communication channel between the transmitter 10 and the receiver 12 may be wireless or wireline, either located internally or externally to the transmitter 10/receiver 12.

As illustrated in FIG. 1, for the transmitter 10, data are transformed in the Inverse Fast Fourier Transform (IFFT) 101, followed by multi-carrier modulation in the OFDM 103. Subsequently, guard interval (GI) is inserted between adjacent OFDM symbols in the block 105, before the OFDM symbols are converted from digital form into analog form by the Digital to Analog Convert (DAC) 107 and then sent out. In the present embodiment, the guard interval is in a form of cyclic prefix (CP), which copies the latter part of a previous OFDM symbol as the guard interval. It is appreciated by a person skilled in the art that other cyclic extension, such as the cyclic suffix, or other formats may be adapted as well. For the receiver 12, the frequency of the received data is down-converted by a mixer 120 and an oscillator 121, followed by passed through a filter 123. After the received data are converted from analog form into digital form by the Analog to Digital Convert (ADC) 125, a symbol receiving apparatus 127 receives and acquires OFDM symbols. The configurations of the OFDM symbols are determined by a detector 129 that will be described in details as follows. After the configuration is detected, the receiver 12 subsequently performs other procedures, such as Fast Fourier Transform (not illustrated), to recover the data originated in the transmitter 10.

Figure 2:
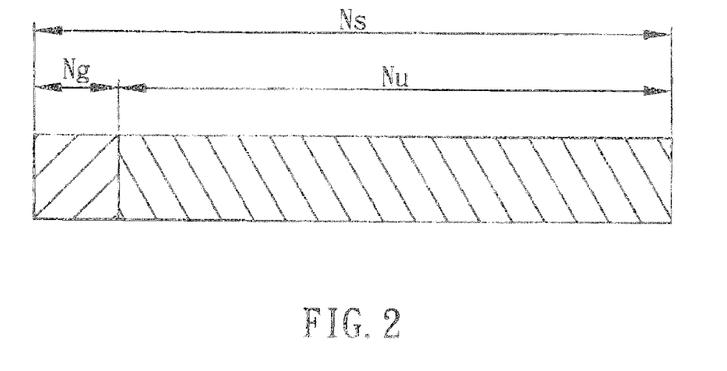
FIG. 2 schematically shows an OFDM symbol.

FIG. 2 schematically shows an OFDM symbol with symbol size (or length) $N_s$. The OFDM symbol is composed of a guard interval having length $N_g$, and a useful part having length $N_u$. In the DVB-H, there are three modes—2K, 4K, and 8K according to respective FFT size; and there are four kinds of guard interval lengths—1/4, 1/8, 1/16, and 1/32 equal to ratio of the guard interval length $N_g$ and the useful part length $N_u$ (i.e., $N_g/N_u$). The three modes and four kinds of guard interval lengths result in totally twelve combined configurations. In a system where no pilot symbol or other equivalent signaling means is used to acquire the configuration, the receiver 12, according to the embodiment of the present invention, needs to detect the configuration prior the synchronization by CP based correlation. The correlation is expressed as follows:

$$V(\theta) = \sum_{n=\theta}^{\theta+N_g-1} y^*(n)y(n+N_u) \quad (1)$$

where y(n) is the received data after the filter 123 and the ADC 125, $n=-\infty, \ldots, -1, 0, 1, \ldots, +\infty$; $\theta$ is the starting position of this CP based correlation; and "*" denotes complex conjugate operation.

As the starting position is moving forward within a range equal to the OFDM symbol duration $N_s$, the correlation amplitude arrives at the maximum value when $\theta=\theta_0$, that is, $$\theta_0 = \arg\max_\theta |V(\theta)| \quad (2)$$

Without loss of generality, the moving range of $\theta$ could be denoted as $[n_0, n_0+N_s-1]$, and a statistics $\rho$ is calculated as $$S(\theta_0) = 0.5 \cdot \sum_{n=\theta_0}^{\theta_0+N_g-1} (|y(n)|^2 + |y(n+N_u)|^2) \quad (3)$$

$$\rho = \frac{|V(\theta_0)|}{S(\theta_0)} \quad (4)$$

The statistics $\rho$ is related to signal-to-noise ratio (SNR) as $\rho=SNR/(SNR+1)$. The moving range of the CP based correlation is of different length according to its specific configuration, and is dependent on the FFT size and the guard interval length ($N_g$). The smallest moving ranges of the twelve configurations are listed in Table 1.

TABLE 1

| | mode | | |
|---|---|---|---|
| GI | 2K ($N_u$ = 2048) | 4K ($N_u$ = 4096) | 8K ($N_u$ = 8192) |
| 1/4 | 512 + 2048 | 1024 + 4096 | 2048 + 8192 |
| 1/8 | 256 + 2048 | 512 + 4096 | 1024 + 8192 |
| 1/16 | 128 + 2048 | 256 + 4096 | 512 + 8192 |
| 1/32 | 64 + 2048 | 128 + 4096 | 256 + 8192 |

Figure 3A:
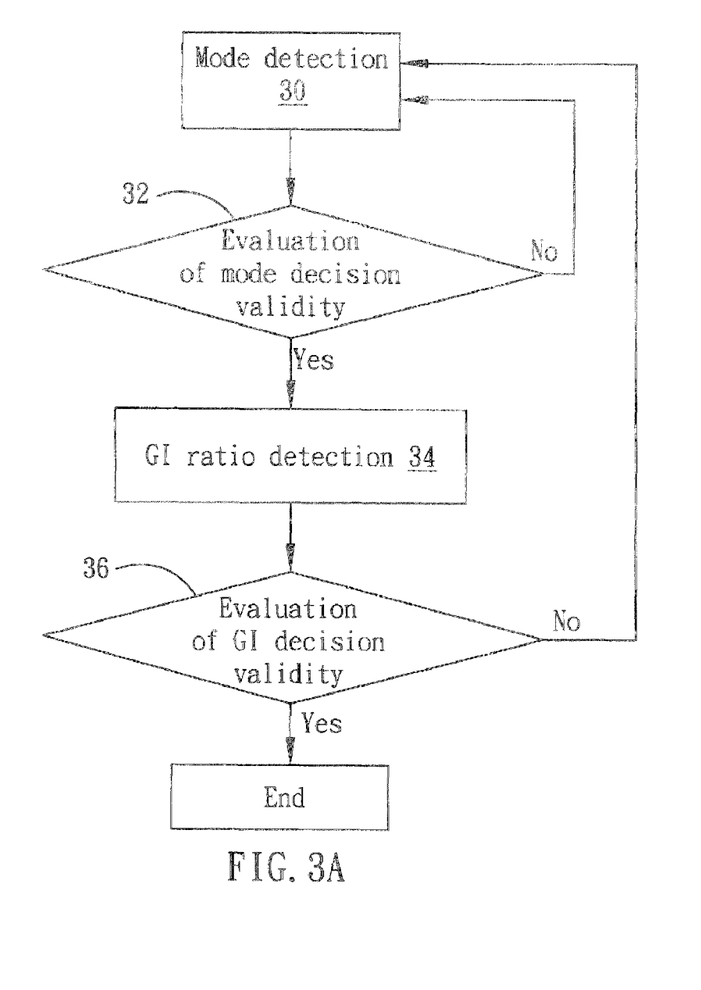
FIG. 3A shows a flow chart of a method for detecting mode and guard interval according to one embodiment of the present invention.

FIG. 3A shows a flow chart of a method for detecting mode and guard interval according to one embodiment of the present invention. The method primarily includes two stages: the first stage for mode detection (step 30), and the second stage for guard interval ratio detection (step 34). In the embodiment, the validity of mode decision from the mode detection (step 30) is evaluated by a following step 32. The mode detection (step 30) is repeatedly performed until the mode decision is valid, at that time the guard interval ratio detection (step 34) is performed thereafter. Further, in the embodiment, the validity of guard interval decision from the guard interval ratio detection (step 34) is evaluated by a following step 36. The mode detection (step 30) is repeatedly performed until the guard interval decision is valid, at that time the whole detection ends. In another embodiment (not depicted in the figure), the guard interval ratio detection (step 34), rather than the mode detection (step 30), is repeatedly performed until the guard interval decision is valid (step 36). Each step of FIG. 3A will be described in details accompanying FIGS. 3B-3E respectively. The method illustrated in FIGS. 3A-3E could be implemented by existing or future technique or tools, either in hardware, software, or combined manner. As being well known to a person skilled in the pertinent art of the present invention, the discussion of the implementing technique is thus omitted in this specification Mode Detection (Step 30)

Figure 3B:
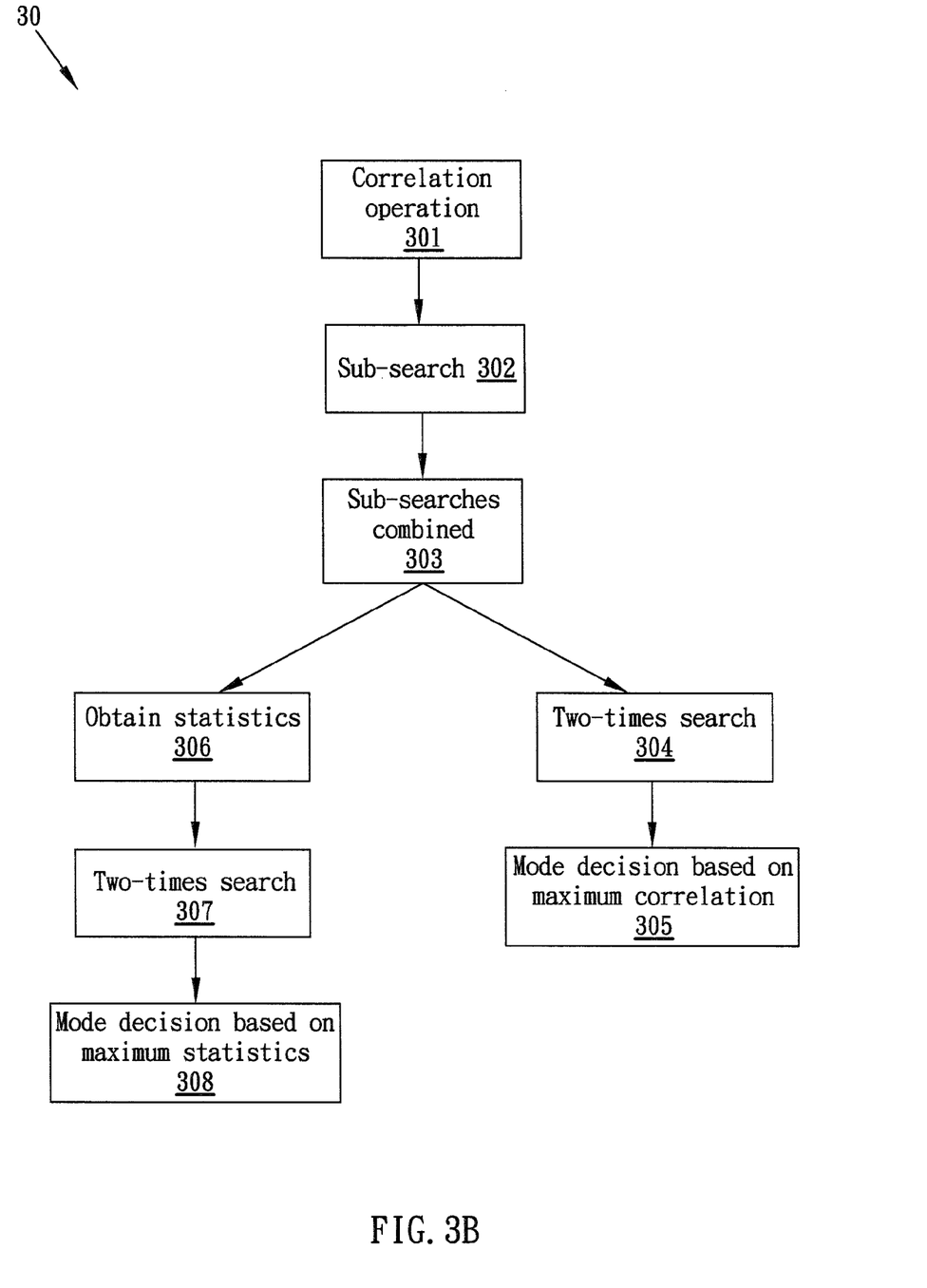
FIG. 3B shows an exemplary detailed flow chart of the mode detection in FIG. 3A.

FIG. 3B shows an exemplary detailed flow chart of the mode detection (step 30) in FIG. 3A. A mode detection variable m(i) for the correlation operation (step 301) is firstly defined as follows:

$$m(i) = \frac{1}{N_g(i)} \max_{\theta \in \Omega_i} \sum_{n=\theta}^{\theta+N_g(i)-1} y^*(n)y(n+N_u(i)) \quad (5)$$

where i=0, 1, 2 correspond to mode 2K, 4K, and 8K respectively; $N_u(i)=2048, 4196$, and 8192 for i=0, 1, 2 respectively; and $N_g(i)=N_u(i)/32=64, 128$, and 256 for i=0, 1, 2 respectively where the minimum guard interval length (i.e., $N_u(i)/32$) is chosen. $\Omega_i=\{n_0, n_0+1, \ldots, n_0+N_u(i)+N_u(i)/4-1\}$ denotes the moving range for the three modes i=0, 1, 2 as shown in Table 2. Without loss of generality, $n_0=0$ is the first data sample in a buffer for the mode and guard interval detection.

TABLE 2

| mode i | moving range $\Omega_i$ | length of the moving range |
|---|---|---|
| 2K(i = 0) | $\{n_0, n_0 + 1, \ldots, n_0 + 2048 + 2048/4 - 1\}$ | $2048 \cdot (5/4)$ |
| 4K(i = 1) | $\{n_0, n_0 + 1, \ldots, n_0 + 4196 + 4196/4 - 1\}$ | $4196 \cdot (5/4)$ |
| 8K(i = 2) | $\{n_0, n_0 + 1, \ldots, n_0 + 8192 + 8192/4 - 1\}$ | $8192 \cdot (5/4)$ |

The length of the moving range is different among the modes with the longest length (i.e., 8192+8192/4 or 8192·(5/4)) four times the length of the shortest length (i.e., 2048+2048/4 or 2048·(5/4)). To make better use of the received data for accelerating the operation and saving storage space, multiple searches (also called sub-searches) may be performed (step 302) in, for example, the longest moving range, i.e., $\Omega_2=\{n_0, n_0+1, \ldots, n_0+8192+8192/4-1\}$ of the mode 8K. For example, four sub-searches of the mode 2K may be performed in $\Omega_2$, expressed as $\Omega_0(l)=\{n_l, n_l+1, \ldots, n_l+2048+2048/4-1\}$, $l=0, 1, 2, 3$. Two sub-searches of the mode 4K may be performed in $\Omega_2$, expressed as $\Omega_1(l)=\{n_l, n_l+1, \ldots, n_l+4096+4096/4-1\}$, $l=0, 1$.

As multiple sub-searches are performed in the moving range of mode 8K (with the length of 8192+8192/4), the mode detection variable m for the correlation operation is expressed as $$m(i, l) = \max_{\theta \in \Omega_i(l)} \sum_{n=\theta}^{\theta+N_g(i)-1} y^*(n)y(n + N_u(i)) \quad (6)$$

where, for the mode 2K (i=0), moving range $\Omega_i(l)=\{n_l, n_l+1, \ldots, n_l+N_u(i)+N_u(i)/4-1\}$ with $n_l=n_0+l\cdot(2048+2048/4)$, $l=0, 1, 2, 3$;

for the mode 4K (i=1), moving range $\Omega_i(l)=\{n_l, n_l+1, \ldots, n_l+N_u(i)+N_u(i)/4-1\}$ with $n_l=n_0+l\cdot(4096+4096/4)$, $l=0, 1$;

for the mode 8K (i=2), moving range $\Omega_i(l)=\{n_l, n_l+1, \ldots, n_l+N_u(i)+N_u(i)/4-1\}$ with $n_l=n_0+l\cdot(8192+8192/4)$, $l=0$.

For acquiring a robust mode decision, the multiple sub-searches with shorter length may be combined (step 303) as $$M(i) = \underset{l=0}{\overset{L(i)}{C}}(m(i, l)) \quad (7)$$

where L(i)=3, 1, 0 for i=0, 1, 2 respectively;

$$\underset{0}{\overset{L}{C}}(\ )$$

denotes a combination function which has an expression as (8) or (9):

$$C_0(m(i, l)) = \sum_{l=0}^{L} \sqrt{|m(i, l)|^2} \quad (8)$$

$$C_1(m(i, l)) = \sqrt{\left|\sum_{l=0}^{L} m(i, l)\right|^2} \quad (9)$$

It is observed that the total length of above search is 8192+8192/4. For more reliable detection, a further search (or more searches) may be performed (step 304), and the search length is thus twice the previous one, resulting in the search length of 2*(8192+8192/4). For this two-times search, L(i) becomes $$L(i)=7,3,1 \text{ where } i=0,1,2 \quad (10)$$

Thereafter, mode decision based on the maximum correlation value (step 305) is obtained as follows:

$$m_0 = \underset{i}{\arg\max} M(i) \quad (11)$$

Alternatively, the mode decision may be obtained based on statistics instead. The statistics operation is one of the correlation operations. In the embodiment, the statistics ρ is obtained (step 306) by (12)-(15):

$$\theta_0(i, l) = \underset{\theta \in \Omega_i(l)}{\arg\max} \sum_{n=\theta}^{\theta+N_g(i)-1} y^*(n)y(n + N_u(i)) \quad (12)$$

$$s(i, l) = 0.5 \cdot \sum_{n=\theta_0(i,l)}^{\theta_0(i,l)+N_g(i)-1} (|y(n)|^2 + |y(n + N_u(i))|^2) \quad (13)$$

$$S(i) = \sum_{l=0}^{L(i)} s(i, l) \quad (14)$$

$$\rho(i) = \frac{M(i)}{S(i)} \quad (15)$$

The mode decision based on the maximum statistics ρ is obtained as follows:

$$m_0 = \underset{i}{\arg\max} \rho(i) \quad (16)$$

If two-times search with total length 2*(8192+8192/4) is performed, an expression similar to (7) is shown below:

$$M(i, t) = \underset{l=t\cdot(L(i)+1)}{\overset{2t\cdot L(i)+1}{C}}(m(i, l)) \quad (7a)$$

where t=0, 1 represent the two searches; L(i)=3, 1, 0 correspond to modes i=0, 1, 2 respectively.

The mode decision based on the maximum correlation value of M(i,t) is obtained, similar to (11), as follows:

$$m_0(t) = \underset{i}{\arg\max} M(i, t) \quad (11a)$$

If two-times (or multi-times) search (step 307) is performed, the mode decision based on the maximum statistics ρ is obtained (step 308), similar to (16) as follows:

$$m_0(t) = \underset{i}{\arg\max} \rho(i, t) \quad (16a)$$

Figure 3C:
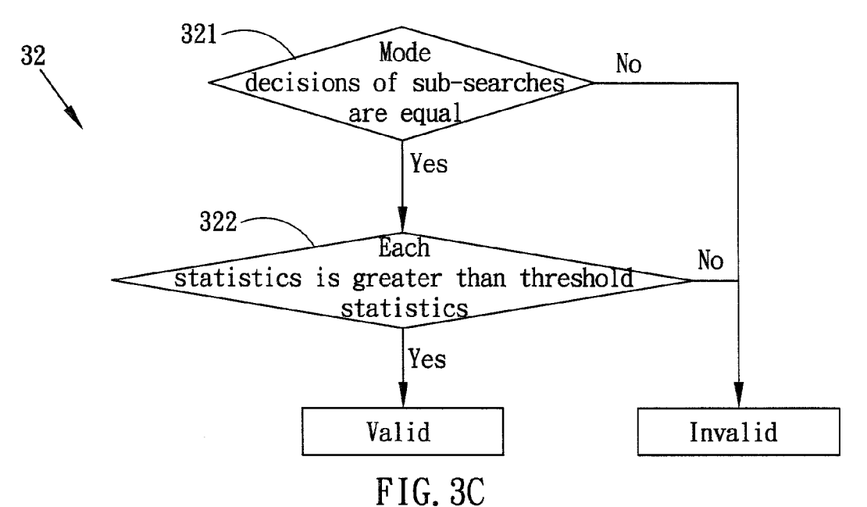
FIG. 3C shows an exemplary detailed flow chart of the evaluation of mode decision validity in FIG. 3A.

The resultant values obtained through those two-times search may be reused in the following evaluation of mode decision validity (step 32) for canceling/correcting mode decision error.

Evaluation of Mode Decision Validity (step 32)

FIG. 3C shows an exemplary detailed flow chart of the evaluation of mode decision validity (step 32) in FIG. 3A.

Firstly, a threshold statistics value $\rho_m$ for the statistics $\rho$ is predetermined. The validity of the mode decision is decided as follows:

If $\rho$ ($m_0$)>$\rho_m$, mode decision is decided as valid

Else mode decision is decided as invalid

If two (or more) sub-searches have been performed, the mode decisions of the sub-searches are compared to decide whether these mode decisions are equal (step 321). If the mode decisions are equal, each statistics of the sub-searches is further compared to the threshold statistics value $\rho_m$ to determine whether each statistics is greater than the threshold statistics value $\rho_m$ (step 322). If all the comparisons are positive, the mode decision is valid; otherwise the mode decision is invalid. The overall evaluation of mode decision validity may be expressed as follows:

If $m_0(0)==m_0(1)$ && $\rho$ ($m_0(0)$)>$\rho_m$ && $\rho$ ($m_0(1)$)>$\rho_m$, mode decision is valid Else mode decision is invalid Alternatively, the overall evaluation of mode decision validity may be expressed in a compact form as follows:

If $m_0(0)==m_0(1)$ && $\rho$ ($m_0$)>$\rho_m$, mode decision is valid

Else mode decision is invalid where $\rho$ (m) is the combined result from the two sub-searches when $m_0(0)==m_0(1)$.

Different threshold statistics value $\rho_m$ can be chosen for different mode in the step 30. In the embodiment, the various threshold statistics values $\rho_m$ have values in a sequence from low to high corresponding to mode 8K, 4K, and 2K respectively, while other sequence could be adapted. Guard Interval Ratio Detection (step 34)

Guard Interval Detection (step 34)

Figure 3D:
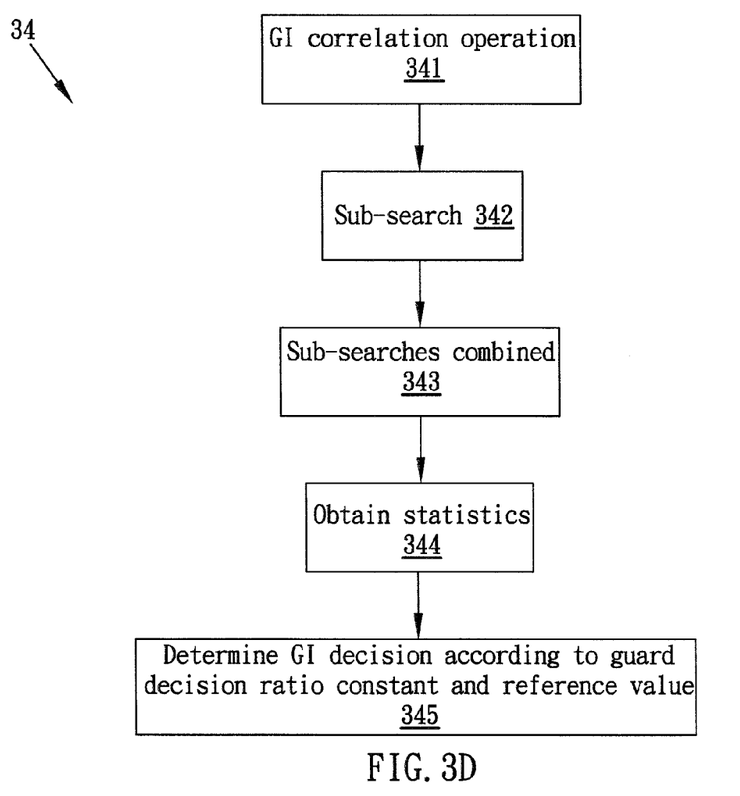
FIG. 3D shows an exemplary detailed flow chart of the guard interval ratio detection in FIG. 3A.

FIG. 3D shows an exemplary detailed flow chart of the guard interval ratio detection (step 34) in FIG. 3A, which is performed after the step 30 is performed and the conditions of the step 32 are met. Firstly, CP based correlation for the minimum guard interval length (i.e., $N_u(i)/32$) has been performed, and corresponding resultant values, such as $m_0$, $\rho(m_0)$, $\theta_0(m_0,l)$, can be reused in the present step. Thereafter, CP based correlation for other guard interval length is performed as $$g(j, l) = \max_{\theta \in \Omega_{m_0}(l)} \sum_{n=\theta}^{\theta+N_g(j)-1} y^*(n)y(n + N_u(m_0)) \quad (17)$$

where j=0, 1, 2, 3 correspond to guard interval ratios 1/4, 1/8, 1/16 and 1/32 respectively; the guard interval length $N_g(j)=N_u(m_0)/4, N_u(m_0)/8, N_u(m_0)/16, N_u(m_0)/32$ for j=0, 1, 2, 3.

$$\theta_0(j, l) = \arg\max_{\theta} \max_{\theta \in \Omega_{m_0}(l)} \sum_{n=\theta}^{\theta+N_g(j)-1} y^*(n)y(n + N_u(m_0)) \quad (18A)$$

$$s(j, l) = 0.5 \cdot \sum_{n=\theta_g(j,l)}^{\theta_g(j,l)+N_g(j)-1} (|y(n)|^2 + |y(n + N_u(m_0))|^2) \quad (18B)$$

If sub-searches are performed (step 342), the multiple sub-searches are combined (step 343) as $$G(j) = \overset{L(m_0)}{\underset{l=0}{C}} (g(j, l)) \quad (19A)$$

$$S(j) = \sum_{l=0}^{L(m_0)} s(j, l) \quad (19B)$$

The statistics $\rho_g(j)$ for different guard interval length j=0, 1, 2, 3 may be obtained (step 344)

$$\rho_g(j) = \frac{G(j)}{S(j)} \quad (20)$$

Subsequently, guard interval length is detected according to the following procedure. Firstly, a guard decision ratio constant $R_g$ is defined to be $0.5 < R_g \leq 1$, which can be set to an optimal value according to simulation with the trade off between a detection ratio and a decision correct ratio, wherein the detection ratio is defined as the ratio of the valid decisions and the total decisions; and the decision correct ratio is defined as the ratio of the correct decisions and the total valid decisions.

The guard interval decision $g_0$ is then determined according to guard decision ratio constant $R_g$ and a reference value $\rho_r$ (step 345). Firstly, $\rho_g(3)$ or the maximum value of $\rho_g(j)$ (j=0, 1, 2, 3) is chosen as the reference value $\rho_r$ (i.e., $\rho_r=\rho_g(3)$ or $\rho_r=\max \rho_g(j)$). Subsequently, the guard interval decision $g_0$ is obtained as follows:

```
g_0=0;
for (j=0; j<3; j++)
{
    if(ρ_g(j)< R_g · ρ_r)
        g_0=j+1;
}
```

If two-times searches are performed, respective results are combined for more reliable decision.

Evaluation of Guard Interval Decision Validity (step 36)

Figure 3E:
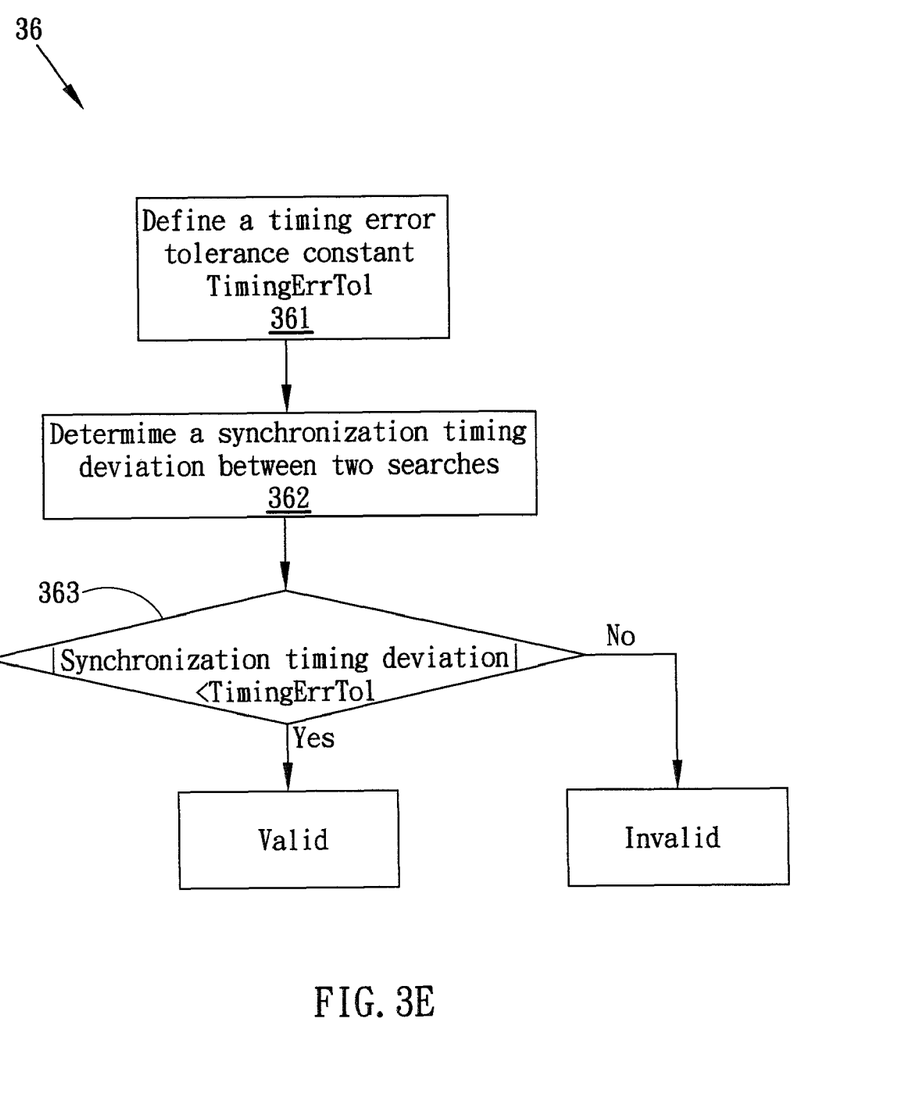
FIG. 3E shows an exemplary detailed flow chart of the evaluation of guard interval decision validity in FIG. 3A.

The OFDM symbol length $N_s(g_0,m_0)=N_{g0}(m_0)+N_u(m_0)$ can be determined from the decided mode (step 30) and the guard interval ratio length (step 34). If at least two-times search (i.e., search length of total 2*(8192+8192/4)) is performed, at least two synchronization positions can be found for all of the modes. The relationship between the synchronization positions is then utilized to evaluate the validity of the guard interval detection.

FIG. 3E shows an exemplary detailed flow chart of the evaluation of guard interval decision validity (step 36) in FIG. 3A. Firstly, a timing error tolerance constant designated as TimingErrTol is defined (step 361), and is an integer larger than zero. The timing error tolerance constant TimingErrTol can be set to an optimal value according to simulation with the trade off between the detection ratio and the decision correct ratio. Different timing error tolerance constant TimingErrTol can be chosen for different mode in the step 30. In the embodiment, the various timing error tolerance constants TimingErr Tol have values in a sequence from high to low corresponding to mode 8K, 4K, and 2K respectively, while other sequence could be adapted.

Subsequently, a synchronization timing deviation τ between two searches of the two-times search is determined (step 362) as follows:

$$\tau(l,l') = |\theta_g(g_0,l) - \theta_g(g_0,l')| \% N_s(g_0,m_0)$$

$$\text{if}(\tau(l,l') > N_s(g_0,m_0)/2)$$

$$\tau(l,l') = \tau(l,l') - N_s(g_0,m_0)$$

where "%" is the modulus operation.

In step 363, the absolute value of the synchronization timing deviation τ is compared to the timing error tolerance constant TimingErrTol to determine whether the absolute value of the synchronization timing deviation τ is less than the timing error tolerance constant TimingErrTol. If the comparison is positive, the guard interval decision is decided as valid; otherwise the guard interval decision is decided as invalid. The step 363 may be expressed as follows:

If |τ(l,l')|<TimingErrTol, guard interval decision is valid
Else guard interval decision is invalid where l and l' represent two different (8192+8192/4) searches; and for the mode 2K ($m_0=0$), l can be 0, 1, 2, 3 as the four sub-searches within the first (8192+8192/4) search, and l' can be 0, 1, 2, 3 as the four sub-searches within the second (8192+8192/4) search;

for the 4K mode ($m_0=1$), l can be 0, 1 as the two sub-searches within the first (8192+8192/4) search, and l' can be 0, 1 as the two sub-searches within the second (8192+8192/4) search;

for the 8K mode ($m_0=1$), l is 0 as the sole search within the first (8192+8192/4) search, and l' is 0 as the sole search within the second (8192+8192/4) search.

The above timing error requirement can be demanded on all or part of the available synchronization positions pairs, depending on the trade off between the detection ratio and the error detection capability.

Figure 4:
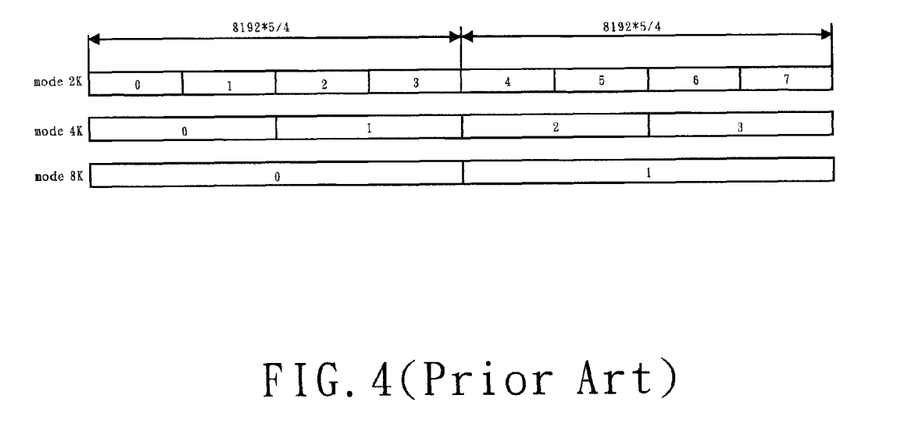
FIG. 4 illustrates a conventional correlation structure for OFDM system, in which search ranges are sub-divided.

According to the embodiments of the present invention, a novel correlation structure is proposed. Before looking into this novel correlation structure, a conventional correlation structure for OFDM system is firstly illustrated in FIG. 4. In the figure, two (8192+8192/4) searches are sub-divided respectively as shown. Specifically, each (8192+8192/4) search is sub-divided into four, two, and one sub-search range(s) for the mode 2K (i=0), the mode 4K (i=1), and the mode 8K (i=2) respectively. Moreover, for different mode, the CP based correlation has different samples number (i.e., (2048<<i)/32)) in the mode detection stage, and has different samples number (i.e., (2048<<i)/(4*(1<<j)) in the guard interval detection stage, where i=0, 1, 2 correspond to four kinds of guard interval lengths (1/4, 1/8, 1/16, and 1/32); "<<" denotes binary left-shifting operation. For example, when i=1, 2048<<i becomes 4096; when i=2, 2048<<i becomes 8192.

Figure 5:
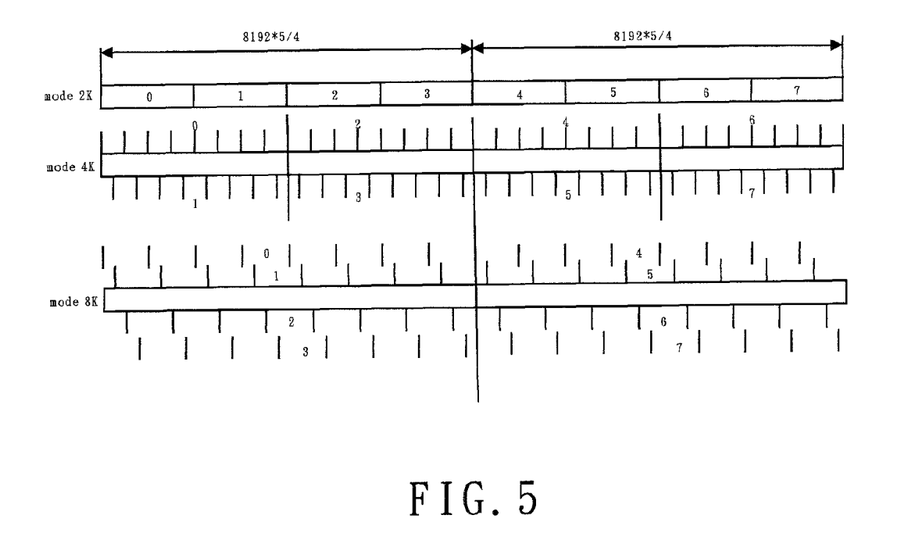
FIG. 5 illustrates a correlation structure according to one embodiment of the present invention.

FIG. 5 illustrates a correlation structure according to one embodiment of the present invention. In this correlation structure, each (8192+8192/4) search (range) is sub-divided (or partitioned) into four sub-search ranges regardless of the mode.

For the mode 2K (i=0), the sub-search ranges (l=0, 1, 2, 3) are as follows:

$$\Omega_i(l=0) = \{0,1,\ldots,N_u(i)\cdot 5/4-1\}$$

$$\Omega_i(l=1) = \{N_u(i)\cdot 5/4, N_u(i)\cdot 5/4+1,\ldots,2\cdot N_u(i)\cdot 5/4-1\}$$

$$\Omega_i(l=2) = \{2\cdot N_u(i)\cdot 5/4, 2\cdot N_u(i)\cdot 5/4+1,\ldots,3\cdot N_u(i)\cdot 5/4-1\}$$

$$\Omega_i(l=3) = \{3\cdot N_u(i)\cdot 5/4, 3\cdot N_u(i)\cdot 5/4+1,\ldots,4\cdot N_u(i)\cdot 5/4-1\}$$

For the mode 4K (i=1), the sub-search ranges (l=0, 1, 2, 3) are as follows:

$$\Omega_i(l=0) = \{0,2,\ldots,N_u(i)\cdot 5/4-2\}$$

$$\Omega_i(l=1) = \{1,3,\ldots,N_u(i)\cdot 5/4-1\}$$

$$\Omega_i(l=2) = \{2\cdot N_u(i)\cdot 5/4, 2\cdot N_u(i)\cdot 5/4+2,\ldots,2\cdot N_u(i)\cdot 5/4-2\}$$

$$\Omega_i(l=3) = \{2\cdot N_u(i)\cdot 5/4+1, 2\cdot N_u(i)\cdot 5/4+3,\ldots,2\cdot N_u(i)\cdot 5/4-1\}$$

For the mode 8K (i=2), the sub-search ranges (l=0, 1, 2, 3) are as follows:

$$\Omega_i(l=0) = \{0,4,\ldots,N_u(i)\cdot 5/4-4\}$$

$$\Omega_i(l=1) = \{1,5,\ldots,N_u(i)\cdot 5/4-3\}$$

$$\Omega_i(l=2) = \{2,6,\ldots,N_u(i)\cdot 5/4-2\}$$

$$\Omega_i(l=3) = \{3,7,\ldots,N_u(i)\cdot 5/4-1\}$$

Figure 6:
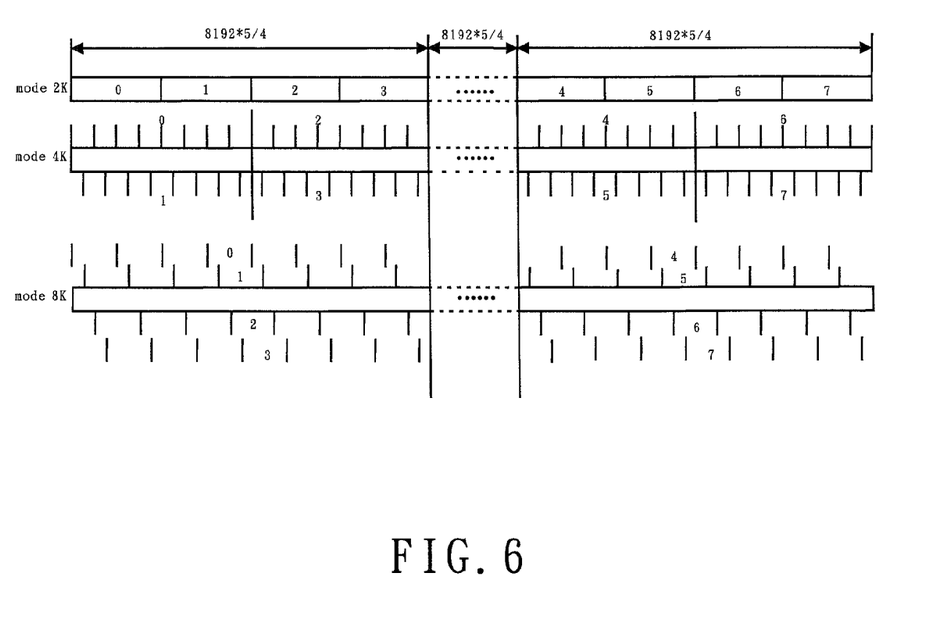
FIG. 6 shows an exemplary correlation structure, in which the first search is apart from the second search.

Another (8192+8192/4) search is sub-divided in the same manner. FIG. 6 shows an exemplary correlation structure, in which the first (8192+8192/4) search is apart from the second (8192+8192/4) search by a number of samples, therefore more reliable decision could be obtained.

The method, apparatus, and system of mode and guard interval detection according to embodiments of the present invention could automatically detect the mode and guard interval length, and possess error rate lower than that in the conventional systems. Furthermore, embodiment of the present invention provides a novel correlation structure for sub-dividing search range in an OFDM system.

Although specific embodiments have been illustrated and described, it will be appreciated by those skilled in the art that various modifications may be made without departing from the scope of the present invention, which is intended to be limited solely by the appended claims.

What is claimed is:

1. A method for detecting mode and guard interval, comprising:
   receiving at least an orthogonal frequency division multiplexing (OFDM) symbol, which includes a guard interval with length $N_g$, and a useful part with length $N_u$, wherein the received OFDM symbol is in one of a plurality of modes in accordance with the length $N_u$ of the useful part, and having one of a plurality of guard interval ratios $N_g/N_u$ in accordance with the length of the guard interval;
   performing a mode detection step for detecting the mode of the OFDM symbol, based on correlation of the OFDM symbol with respect to chosen one of the plurality of guard interval ratios;
   performing a guard interval ratio detection step for detecting the guard interval ratio of the OFDM symbol, based on correlation of the OFDM symbol with respect to all of the guard interval ratios;
   evaluating validity of the guard interval ratio detection step by comparing a timing deviation between two received OFDM symbols with a timing error tolerance constant; and repeating the mode detection step until an absolute value of the timing deviation is less than the timing error tolerance constant.

2. The method according to claim 1, wherein the correlation is statistics value.

3. The method according to claim 2, after the mode detection step, further comprising:

evaluating validity of the mode detection by comparing the statistics value with a threshold value; and repeating the mode detection step until the validity is confirmed, and followed by said performing the guard interval ratio detection step.

4. The method according to claim 1, after the guard interval ratio detection step, further comprising:

evaluating validity of the guard interval ratio detection step by comparing a timing deviation between two received OFDM symbols with a timing error tolerance constant; and repeating the guard interval ratio detection step until an absolute value of the timing deviation is less than the timing error tolerance constant.

5. The method according to claim 1, wherein the mode detection step comprises:

performing correlation operation with respect to the OFDM symbol;

performing a plurality of sub-searches for each of the modes, within a moving range equal a maximum length of the useful part;

combining results of the sub-searches for each of the modes; and determining a mode decision based on the combined results.

6. The method according to claim 5, further comprising performing search within twice the moving range of the maximum length of the useful part.

7. The method according to claim 2, wherein the mode detection step comprises:

performing correlation operation with respect to the OFDM symbol;

performing a plurality of sub-searches for each of the modes, within a moving range equal to a maximum length of the useful part;

combining results of the sub-searches for each of the modes;

correspondingly obtaining the statistics for each of the modes; and determining a mode decision based on maximum of the statistics.

8. The method according to claim 1, wherein the mode detection step comprises:

defining a mode detection variable m(i) as follows:

$$m(i) = \frac{1}{N_g(i)} \max_{\theta \in \Omega_i} \sum_{n=\theta}^{\theta+N_g(i)-1} y^*(n)y(n+N_u(i))$$

where y is the received OFDM symbol; i=0, 1, 2 correspond to mode 2K, 4K, and 8K respectively; ratio of the guard interval and the useful part could be 1/4, 1/8, 1/16 or 1/32;

performing a plurality of sub-searches of the mode 2K or the mode 4K within a moving range of the mode 8K, thereby the mode detection variable being expressed as $$m(i,l) = \max_{\theta \in \Omega_i(l)} \sum_{n=\theta}^{\theta+N_g(i)-1} y^*(n)y(n+N_u(i))$$

where l denotes sequence of the sub-searches; $\Omega_i(l)$ denotes the l-th sub-search of the mode i;

combining results of the sub-searches as $$M(i) = \mathop{C}_{l=0}^{L(i)}(m(i,l))$$

where L(i)=3, 1, 0 for i=0, 1, 2 respectively; $\mathop{C}_{0}^{L}(\ )$ denotes a combination function; and determining a mode decision based on maximum of the M(i), wherein the combination function has an expression of $$C_0(m(i,l)) = \sum_{l=0}^{L} \sqrt{|m(i,l)|^2}$$

or $$C_1(m(i,l)) = \sqrt{\left|\sum_{l=0}^{L} m(i,l)\right|^2}.$$

9. The method according to claim 2, wherein the mode detection step comprises:

obtaining the statistics value ρ by $$\theta_0(i,l) = \arg\max_{\theta \in \Omega_i(l)} \sum_{n=\theta}^{\theta+N_g(i)-1} y^*(n)y(n+N_u(i))$$

$$s(i,l) = 0.5 \cdot \sum_{n=\theta_0(i,l)}^{\theta_0(i,l)+N_g(i)-1} (|y(n)|^2 + |y(n+N_u(i))|^2)$$

$$S(i) = \sum_{l=0}^{L(i)} s(i,l)$$

$$\rho(i) = \frac{M(i)}{S(i)}$$

where y is the received OFDM symbol; i=0, 1, 2 correspond to mode 2K, 4K, and 8K respectively; ratio of the guard interval and the useful part could be 1/4, 1/8, 1/16 or 1/32; l denotes sequence of the sub-searches; $\Omega_i(l)$ denotes the l-th sub-search of the mode i; and determining a mode decision based on maximum of the statistics value ρ.

10. The method according to claim 1, wherein the mode detection step comprises:

defining a mode detection variable m(i) as follows:

$$m(i) = \frac{1}{N_g(i)} \max_{\theta \in \Omega_i} \sum_{n=\theta}^{\theta+N_g(i)-1} y^*(n)y(n+N_u(i))$$

where y is the received OFDM symbol; i=0, 1, 2 correspond to mode 2K, 4K, and 8K respectively; ratio of the guard interval and the useful part could be 1/4, 1/8, 1/16 or 1/32;

performing a plurality of sub-searches of the mode 2K or the mode 4K within a moving range of the mode 8K, thereby the mode detection variable being expressed as $$m(i, l) = \max_{\theta \in \Omega_i(l)} \sum_{n=\theta}^{\theta+N_g(i)-1} y^*(n)y(n + N_u(i))$$

where l denotes sequence of the sub-searches; $\Omega_i(l)$ denotes the l-th sub-search of the mode i;

repeating the previous step and combing results as $$M(i, t) = \underset{l=t\cdot(L(i)+1)}{\overset{2t\cdot L(i)+1}{C}} (m(i, l))$$

where t=0, 1 represent the two steps; L(i)=3, 1, 0 correspond to modes i=0, 1, 2 respectively; and determining a mode decision based on maximum of the M(i,t).

11. The method according to claim 2, wherein the guard interval ratio detection step comprises:

obtaining correlation with respect with the guard intervals by $$g(j, l) = \max_{\theta \in \Omega_{m_0}(l)} \sum_{n=\theta}^{\theta+N_g(j)-1} y^*(n)y(n + N_u(m_0))$$

where j=0, 1, 2, 3 correspond to ratio of the guard interval and the useful part 1/4, 1/8, 1/16 and 1/32 respectively; the length of the guard interval $N_g(j)=N_u(m_0)/4$, $N_u(m_0)/8$, $N_u(m_0)/16$, $N_u(m_0)/32$ for j=0, 1, 2, 3; l denotes sequence of sub-searches; $\Omega_{m_0}(l)$ denotes the l-th sub-search of the mode i;

obtaining the statistics value $\rho_g(j)$ as follows:

$$\theta_0(j, l) = \arg\max_{\theta \in \Omega_{m_0}(l)} \sum_{n=\theta}^{\theta+N_g(j)-1} y^*(n)y(n + N_u(m_0))$$

$$s(j, l) = 0.5 \cdot \sum_{n=\theta_g(j,l)}^{\theta_g(j,l)+N_g(j)-1} (|y(n)|^2 + |y(n + N_u(m_0))|^2)$$

$$G(j) = \underset{l=0}{\overset{L(m_0)}{C}} (g(j, l))$$

$$S(j) = \sum_{l=0}^{L(m_0)} s(j, l)$$

$$\rho_g(j) = \frac{G(j)}{S(j)}$$

defining a guard decision ratio constant $R_g$ to be $0.5 < R_g \leq 1$;

defining a reference value $\rho_r$ as $\rho_g(3)$ or maximum value of $\rho_g(j)$, where j=0, 1, 2, 3; and determining a guard interval decision as follows:

```
g_0=0;
for (j=0; j<3; j++)
{
    if(ρ_g(j)< R_g · ρ_r)
        g_0=j+1;
}.
```

12. The method according to claim 5, further comprising:
allocating ranges of the sub-searches as follows:
for the mode 2K (i=0), the ranges of the sub-searches (l=0, 1, 2, 3) are $\Omega_i(l=0)=\{0,1,\ldots,N_u(i)\cdot 5/4-1\}$ $\Omega_i(l=1)=\{N_u(i)\cdot 5/4, N_u(i)\cdot 5/4+1,\ldots, 2\cdot N_u(i)\cdot 5/4-1\}$ $\Omega_i(l=2)=\{2\cdot N_u(i)\cdot 5/2, 2\cdot N_u(i)\cdot 5/4+1,\ldots, 3\cdot N_u(i)\cdot 5/4-1\}$ $\Omega_i(l=3)=\{3\cdot N_u(i)\cdot 5/4, 3\cdot N_u(i)\cdot 5/4+1,\ldots, 4\cdot N_u(i)\cdot 5/4-1\}$ for the mode 4K (i=1), the ranges of the sub-searches (l=0, 1, 2, 3) are $\Omega_i(l=0)=\{0,2,\ldots,N_u(i)\cdot 5/4-2\}$ $\Omega_i(l=1)=\{1,3,\ldots,N_u(i)\cdot 5/4-1\}$ $\Omega_i(l=2)=\{2\cdot N_u(i)\cdot 5/4, 2\cdot N_u(i)\cdot 5/4+2,\ldots, 2\cdot N_i(i)\cdot 5/4-2\}$ $\Omega_i(l=3)=\{2\cdot N_u(i)\cdot 5/4+1, 2\cdot N_u(i)\cdot 5/4+3,\ldots, 2\cdot N_u(i)\cdot 5/4-1\}$ for the mode 8K (i=2), the ranges of the sub-searches (l=0, 1, 2, 3) are $\Omega_i(l=0)=\{0,4,\ldots,N_u(i)\cdot 5/4-4\}$ $\Omega_i(l=1)=\{1,5,\ldots,N_u(i)\cdot 5/4-3\}$ $\Omega_i(l=2)=\{2,6,\ldots,N_u(i)\cdot 5/4-2\}$ $\Omega_i(l=3)=\{3,7,\ldots,N_u(i)\cdot 5/4-1\}$.

13. A system for detecting mode and guard interval, comprising:

a receiver including:
symbol receiving apparatus, for receiving at least an orthogonal frequency division multiplexing (OFDM) symbol, which includes a guard interval with length $N_g$, and a useful part with length $N_u$, wherein the received OFDM symbol is in one of a plurality of modes in accordance with the length $N_u$ of the useful part, and having one of a plurality of guard interval ratios $N_g/N_u$ in accordance with the length of the guard interval;

a detector, for detecting the mode and the guard interval, said detector performing the steps of:
performing a mode detection step for detecting the mode of the OFDM symbol, based on correlation of the OFDM symbol, with respect to chosen one of the plurality of guard interval ratios;
performing a guard interval ratio detection step for detecting the guard interval ratio of the OFDM symbol, based on correlation of the OFDM symbol with respect to all of the guard interval ratios;
evaluating validity of the guard interval ratio detection step by comparing a timing deviation between two of the OFDM symbols with a timing error tolerance constant; and repeating the guard interval ratio detection step until an absolute value of the timing deviation is less than the timing error tolerance constant.

14. The system according to claim 13, wherein the mode detection step comprises:
performing correlation operation with respect to the OFDM symbol;
performing a plurality of sub-searches for each of the modes, within a moving range equal a maximum length of the useful part;
combining results of the sub-searches for each of the modes; and
determining a mode decision based on the combined results.

15. The system according to claim 14, further comprising performing search within twice the moving range of the maximum length of the useful part.

16. The system according to claim 13, wherein the mode detection step comprises:
defining a mode detection variable m(i) as follows:

$$m(i) = \frac{1}{N_g(i)} \max_{\theta \in \Omega_i} \sum_{n=\theta}^{\theta+N_g(i)-1} y^*(n)y(n+N_u(i))$$

where y is the received OFDM symbol; i=0, 1, 2 correspond to mode 2K, 4K, and 8K respectively; ratio of the guard interval and the useful part could be 1/4, 1/8, 1/16 or 1/32;
performing a plurality of sub-searches of the mode 2K or the mode 4K within a moving range of the mode 8K, thereby the mode detection variable being expressed as $$m(i, l) = \max_{\theta \in \Omega_i(l)} \sum_{n=\theta}^{\theta+N_g(i)-1} y^*(n)y(n+N_u(i))$$

where l denotes sequence of the sub-searches; $\Omega_i(l)$ denotes the l-th sub-search of the mode i;
combing results of the sub-searches as $$M(i) = \underset{l=0}{\overset{L(i)}{C}}(m(i, l))$$

where L(i)=3, 1, 0 for i=0, 1, 2 respectively; $\overset{L}{\underset{0}{C}}(\ )$ denotes a combination function; and
determining a mode decision based on maximum of the M(i), wherein the combination function has an expression of $$C_0(m(i, l)) = \sum_{l=0}^{L} \sqrt{|m(i, l)|^2}$$

or $$C_1(m(i, l)) = \sqrt{\left|\sum_{l=0}^{L} m(i, l)\right|^2}.$$

17. The system according to claim 13, wherein the mode detection step comprises:
defining a mode detection variable m(i) as follows:

$$m(i) = \frac{1}{N_g(i)} \max_{\theta \in \Omega_i} \sum_{n=\theta}^{\theta+N_g(i)-1} y^*(n)y(n+N_u(i))$$

where y is the received OFDM symbol; i=0, 1, 2 correspond to mode 2K, 4K, and 8K respectively; ratio of the guard interval and the useful part could be 1/4, 1/8, 1/16 or 1/32;
performing a plurality of sub-searches of the mode 2K or the mode 4K within a moving range of the mode 8K, thereby the mode detection variable being expressed as $$m(i, l) = \max_{\theta \in \Omega_i(l)} \sum_{n=\theta}^{\theta+N_g(i)-1} y^*(n)y(n+N_u(i))$$

where l denotes sequence of the sub-searches; $\Omega_i(l)$ denotes the l-th sub-search of the mode i;
repeating the previous step and combing results as $$M(i, t) = \underset{l=t \cdot (L(i)+1)}{\overset{2t \cdot L(i)+1}{C}}(m(i, l))$$

where t=0, 1 represent the two steps; L(i)=3, 1, 0 correspond to modes i=0, 1, 2 respectively; and
determining a mode decision based on maximum of the M(i,t).

18. The system according to claim 14, further comprising: allocating ranges of the sub-searches as follows:
for the mode 2K (i=0), the ranges of the sub-searches (l=0, 1, 2, 3) are $\Omega_i(l=0)=\{0,1,\ldots,N_u(i)\cdot 5/4-1\}$ $\Omega_i(l=1)=\{N_u(i)\cdot 5/4,N_u(i)\cdot 5/4+1,\ldots,2\cdot N_u(i)\cdot 5/4-1\}$ $\Omega_i(l=2)=\{2\cdot N_u(i)\cdot 5/2,2\cdot N_u(i)\cdot 5/4+1,\ldots,3\cdot N_u(i)\cdot 5/4-1\}$ $\Omega_i(l=3)=\{3\cdot N_u(i)\cdot 5/4,3\cdot N_u(i)\cdot 5/4+1,\ldots,4\cdot N_u(i)\cdot 5/4-1\}$ for the mode 4K (i=1), the ranges of the sub-searches (l=0, 1, 2, 3) are $\Omega_i(l=0)=\{0,2,\ldots,N_u(i)\cdot 5/4-2\}$ $\Omega_i(l=1)=\{1,3,\ldots,N_u(i)\cdot 5/4-1\}$ $\Omega_i(l=2)=\{2\cdot N_u(i)\cdot 5/4,2\cdot N_u(i)\cdot 5/4+2,\ldots,2\cdot N_i(i)\cdot 5/4-2\}$ $\Omega_i(l=3)=\{2\cdot N_u(i)\cdot 5/4+1,2\cdot N_u(i)\cdot 5/4+3,\ldots,2\cdot N_u(i)\cdot 5/4-1\}$ for the mode 8K (i=2), the ranges of the sub-searches (l=0, 1, 2, 3) are $\Omega_i(l=0)=\{0,4,\ldots,N_u(i)\cdot 5/4-4\}$ $\Omega_i(l=1)=\{1,5,\ldots,N_u(i)\cdot 5/4-3\}$ $\Omega_i(l=2)=\{2,6,\ldots,N_u(i)\cdot 5/4-2\}$ $\Omega_i(l=3)=\{3,7,\ldots,N_u(i)\cdot 5/4-1\}.$ 19. Apparatus for detecting mode and guard interval of an orthogonal frequency division multiplexing (OFDM) symbol, which includes a guard interval with length $N_g$, and a useful part with length $N_u$, the OFDM symbol is in one of a plurality of modes in accordance with the length $N_u$ of the useful part, and having one of a plurality of guard interval ratios $N_g/N_u$ in accordance with the length of the guard interval, said apparatus comprising:

- mode detection means for detecting the mode of the OFDM symbol, based on correlation of the OFDM symbol, with respect to chosen one of the guard intervals;
- guard interval ratio detection means for detecting the guard interval of the OFDM symbol, based on correlation of the OFDM symbol with respect to all of the guard intervals;
- evaluation means for evaluating validity of the guard interval ration detection step by comparing a timing deviation between two received OFDM symbols with a timing error tolerance constant; and
- means for repeating the mode detection step until an absolute value of the timing deviation is less than the timing error tolerance constant.

20. A method for detecting mode and guard interval, comprising:

- receiving at least an orthogonal frequency division multiplexing (OFDM) symbol, which includes a guard interval with length $N_g$, and a useful part with length $N_u$, wherein the received OFDM symbol is in one of a plurality of modes in accordance with the length $N_u$ of the useful part, and having one of a plurality of guard interval ratios $N_g/N_u$ in accordance with the length of the guard interval;
- performing a mode detection step for detecting the mode of the OFDM symbol, based on correlation of the OFDM symbol with respect to chosen one of the plurality of guard interval ratios;
- performing a guard interval ratio detection step for detecting the guard interval ratio of the OFDM symbol, based on correlation of the OFDM symbol with respect to all of the guard interval ratios;
- evaluating validity of the guard interval ratio detection step by comparing a timing deviation between two received OFDM symbols with a timing error tolerance constant; and
- repeating the mode detection step until an absolute value of the timing deviation is less than the timing error tolerance constant.

21. A system for detecting mode and guard interval, comprising:

- a receiver including:
  - a detector, for detecting the mode and the guard interval, said detector performing the steps of:
    - performing a mode detection step for detecting the mode of the OFDM symbol, based on correlation of the OFDM symbol, with respect to chosen one of the plurality of guard interval ratios;
    - performing a guard interval ratio detection step for detecting the guard interval ratio of the OFDM symbol, based on correlation of the OFDM symbol with respect to all of the guard interval ratios;
    - evaluating validity of the guard interval ratio detection step by comparing a timing deviation between two of the OFDM symbols with a timing error tolerance constant; and
    - repeating the mode detection step until an absolute value of the timing deviation is less than the timing error tolerance constant.

* * * * *